TURN-ON AND TURN-OFF CIRCUIT FOR A SEMICONDUCTOR CONTROLLED RECTIFIER ENERGIZED BY AN ALTERNATING CURRENT SUPPLY

Filed April 28, 1966

INVENTORS.
CHARLES J. ADAMS,
CHARLES R. WETTER
BY David M. Schiller
ATTORNEY 3,489,926

TURN-ON AND TURN-OFF CIRCUIT FOR A SEMICONDUCTOR CONTROLLED RECTIFIER ENERGIZED BY AN ALTERNATING CURRENT SUPPLY

Charles J. Adams and Charles R. Wetter, Bloomington, Ill., assignors to General Electric Company, a corporation of New York Filed Apr. 28, 1966, Ser. No. 546,046
Int. Cl. H03k *17/56*
U.S. Cl. 307—252 3 Claims

ABSTRACT OF THE DISCLOSURE

A circuit for improving the turn-on and turn-off characteristics of an SCR includes a pair of input terminals for connection to a source of alternating current and a circuit path including a capacitor connected in series with a diode between the input terminals so that the capacitor is charged through the diode from the source of alternating current. A circuit path including an SCR is connected in parallel with the circuit path including the capacitor and the arrangement is such that while the SCR is in its blocking state and the polarities of the input terminals are such to permit current flow through the diode, the capacitor is charged to apply a positive potential to the anode of the SCR. When the polarities of the input terminals are reversed such that the diode prevents current flow through the SCR from the terminals and a gate signal is applied to the gate of the SCR during such polarity condition, the capacitor discharges through the SCR and continues to discharge for the remainder of such polarity condition so as to maintain conduction of the SCR during such time. A second capacitor is connected between the anode of the diode and the anode of the SCR to apply a negative voltage to the anode of the SCR to assure its turn-off when the polarity condition of the input terminals subsequently changes to that effective to prevent current flow through the SCR from the terminals.

Figures 1, 2, 3:
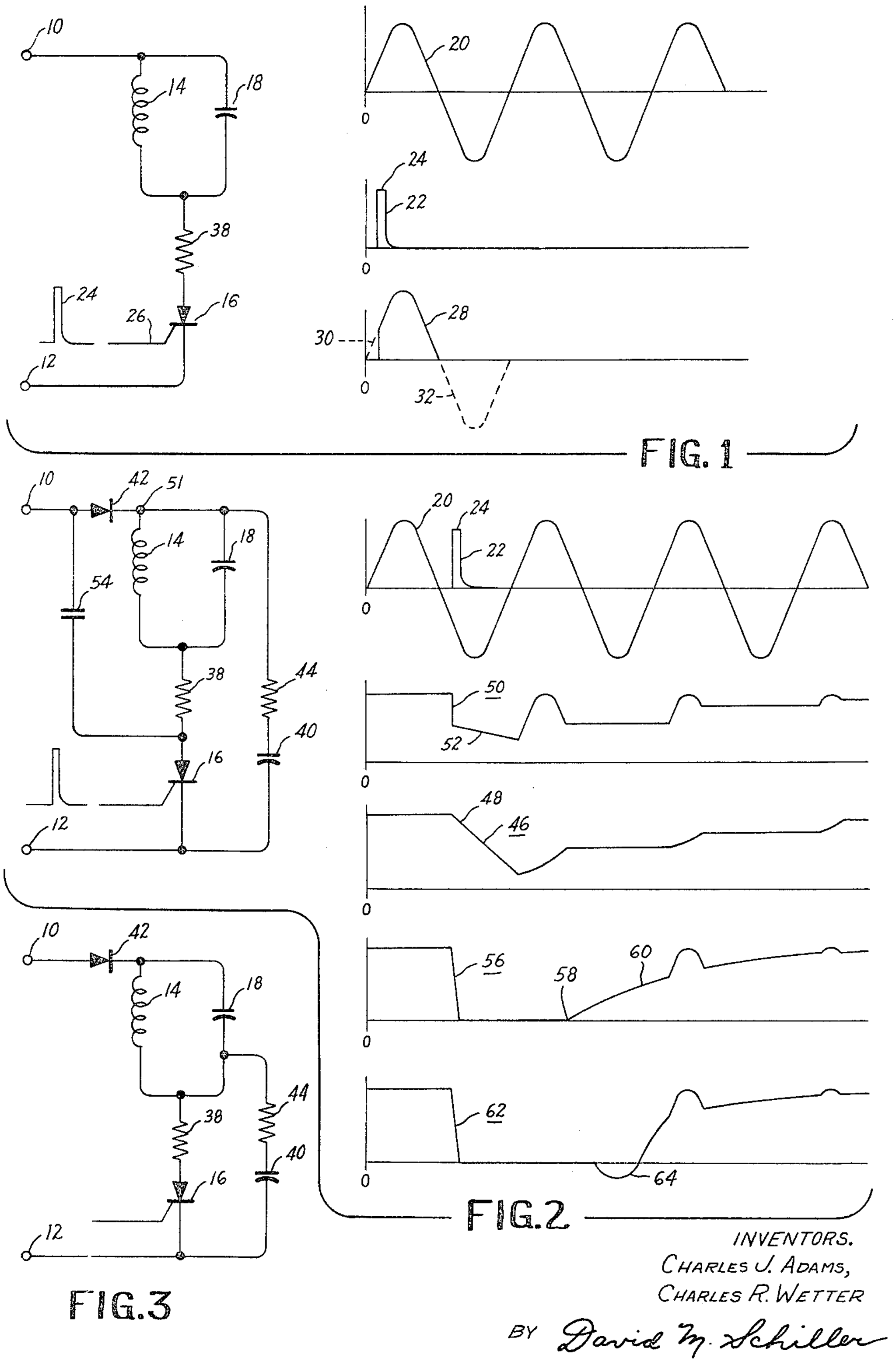

This invention relates to a circuit arrangement which aids in the turn-on and turn-off of a semiconductor controlled rectifier (SCR), such as a silicon controlled rectifier. More specifically the circuit is used with an SCR to effect energization of a load through the SCR from an alternating current (AC) supply for at least one-half cycle each time the SCR is fired or turned on.

An SCR blocks current flow in a first direction at all times, and is bistable to current flow in the opposite or second direction. That is, in the second direction the SCR will block current flow until a signal is applied to the SCR gate terminal, at which time if the SCR anode terminal is more positive than the cathode terminal, the SCR will conduct from anode to cathode. If the polarities of the anode and cathode terminals are reversed, the SCR will not conduct, even though a signal is applied to the gate terminal. As a result of these characteristics of an SCR, if an SCR is energized from an AC supply, and if a signal is applied to the gate during the half cycle when the cathode polarity is positive and the anode polarity is negative, the SCR will not conduct during such half cycle, nor during the next half cycle when the anode and cathode polarities reverse. In certain circuit arrangements it is desirable to have the SCR conduct for at least one-half cycle each time the SCR gate receives a signal at any time during a cycle. For instance, such a single shot signal could be supplied by a logic circuit to the gate of an SCR for a small fraction of a half-cycle, with the SCR being turned on to energize the solenoid of a latching relay for at least one-half cycle.

It is therefore an object of this invention to provide a novel and improved circuit arrangement which will insure that an SCR connected to control energization of a load from an AC supply will be turned on for at least one-half cycle each time a signal is applied to the gate of the SCR, without regard to the instantaneous polarity of the voltage supplied to the SCR anode and cathode terminals.

It is another object of this invention to provide a novel and improved turn-on circuit for an SCR connected to control energization of a load from an AC supply wherein when the SCR gate receives a firing signal while the AC supply voltage instantaneous polarity is such as to make the SCR anode negative, the turn-on circuit provides a voltage of the proper polarity to make the anode positive to render the SCR conducting at a low level until the AC supply voltage instantaneous polarity reverses, after which time the SCR will conduct load current from the AC supply.

It is a further object of this invention to provide a novel and improved turn-off circuit for an SCR connected to control energization of a load from an AC supply effective to impress a negative voltage on the SCR anode when the AC supply voltage passes through zero during its change from positive to negative polarity, to insure turn-off of the SCR.

These objects are accomplished in accordance with this invention, in one form thereof, by providing a turn-on circuit comprising a first capacitor in a circuit path connected in parallel with a circuit path including the SCR. A unidirectional conducting device such as a diode is connected in series with the parallel combination. The arrangement is such that while the SCR is in its blocking state, the first capacitor is charged to the peak AC supply voltage through the diode. When a signal is applied to the gate of the SCR, so as to fire it, the charge on the capacitor is of such polarity as to maintain the SCR anode positive with respect to the cathode, and therefore the SCR will begin conducting, with the first capacitor being discharged through the SCR. Thus, even though the diode may be blocking due to the reversed polarity of the supply voltage, the SCR will conduct due to the discharge of the first capacitor until the polarity of the supply reverses to a positive polarity whereupon current is conducted from the supply through the diode and SCR to the load which is thus energized for at least one-half cycle by the AC supply.

The invention also provides a turn-off circuit including a passive impedance element such as a second capacitor connected to divert discharge current of the first capacitor from the SCR. The circuit established by this impedance element will cause a negative voltage to appear at the anode of the SCR as the supply voltage passes through zero during its change from positive to negative polarity, thereby assuring turn-off of the SCR.

Other objects and further details of that which is believed to be novel in the invention will be clear from the following description and claims taken with the accompanying drawing wherein:

FIGURE 1 includes a circuit diagram of a prior art circuit having an inductive load energized from an AC supply through an SCR, and three graphical representations showing waveforms of electrical quantities present in the circuit shown, FIGURE 2 includes a circuit diagram of the circuit shown in FIGURE 1 modified to include the turn-on and turn-off circuits in accordance with this invention, and three graphical representations showing waveforms of electrical quantities present in the circuit shown, and FIGURE 3 is an alternate embodiment of the circuit shown in FIGURE 2.

Referring to FIGURE 1, the prior art circuit there shown includes terminals 10 and 12 adapted for connection to an AC supply (not shown) and connected in a series circuit including a load 14 and an SCR 16. In a typical application of this circuit the load 14 comprises an inductive load, such as the solenoid of an electromagnetic switch. In the circuit shown, solenoid 14 is energized from the AC supply for a half cycle or less because the SCR can conduct only during positive half cycles of the supply. Since the solenoid would not operate in this short a period, capacitor 18 is added in parallel with the solenoid 14, so as to assure current flow through the solenoid 14 for longer than one-half cycle. That is, after current has ceased flowing through the solenoid from the AC supply terminals 10 and 12 due to a reversal in the instantaneous polarity of the supply, current will continue to flow from capacitor 18 to solenoid 14.

The graphical representations at the right in FIGURE 1 have ordinates which represent magnitudes of the various quantities and which are vertically aligned so as to show the phase relationship between the various voltage and current waveforms depicted. The abscissae represent time. The upper waveform 20 depicts the supply voltage appearing at terminals 10 and 12. The middle waveform 22 depicts the pulse 24 which is applied to a gate 26 of the SCR 16. The pulse 24 is also shown adjacent the gate 26. While the pulse 24 may occur at any point on the supply voltage waveform 20, if it occurs as shown, the anode to cathode current, depicted by the lower waveform 28, flows through the SCR 16. No current flows until the leading edge of the pulse 24, nor does any current flow during the negative half cycle of the supply voltage. The periods during which no current flows are shown by dashed lines 30 and 32. As is shown by waveform 28, the negative half cycle of the supply voltage shuts off SCR 16, and no further current flows until another gate pulse 24 is supplied to gate 26 during a positive half cycle.

With a typical solenoid as the inductive load 14, it has been found that for proper operation of the solenoid the gate pulse 24 has to occur during the rising portion of the positive half cycle of supply voltage. While the SCR 16 will fire when the pulse 24 is provided during the descending portion of the positive half cycle of supply voltage, insufficient current is conducted through the solenoid to cause its contacts to be actuated. Further, if the gate pulse 24 were provided during a negative half cycle, the SCR would not conduct at all due to the inverse bias applied to its anode and cathode terminals. Resistor 38 limits the SCR current flow to a safe peak value.

In order to provide sufficient current flow for turn-on of the SCR at any time during a cycle of the AC supply voltage, and to provide turn-on of the SCR during the negative half cycle of the supply, the turn-on and turn-off circuits shown in FIGURE 2 are added in accordance with the invention to the prior art circuit shown in FIGURE 1. Those elements in FIGURE 2 which correspond to similar circuit elements in FIGURE 1 have the same reference numeral associated there with. In accordance with the invention the turn-on circuit includes a capacitor 40 connected in circuit with the diode 42 and the SCR 16 so as to provide a discharge current through the SCR in response to application of a pulse to the SCR gate at any time during a cycle of the AC supply voltage. In the embodiment shown in FIGURE 2, the capacitor 40 is connected in series with a resistor 44 with this series circuit in parallel with a circuit including the SCR 16, resistor 38 and capactior 18 in series. Capacitor 40 is in series with a diode 42 so as to be charged to the peak line voltage through the diode 42 during the period that the SCR 16 blocking. The charging current of capacitor 40 is limited to a safe value by the current limiting resistor 44. The discharge path for the capacitor 40 includes the SCR 16 and the arrangement is such that the capacitor 40 is discharged in response to application of a gate pulse to the SCR to maintain conduction of the SCR when the diode is blocking.

FIGURE 2 includes at the right five graphical representations showing waveforms of electrical quantities present in the circuit of FIGURE 2. The first upper representation shows a waveform 20 depicting the supply voltage at the terminals 10 and 12, and also shows a waveform 24 depicting the current pulse applied to the gate of SCR 16. The second representation shows a waveform 50 depicting the voltage at the terminal 51 in the circuit of FIGURE 2. The third representation shows a waveform 46 depicting the voltage across capacitor 40. The fourth representation shows a waveform 56 depicting the voltage at the anode of SCR 16 with the capacitor 54 omitted in the circuit of FIGURE 2. The fifth representation shows a waveform 62 depicting the voltage at the anode of SCR 16 with the capacitor 54 connected in the circuit as shown in FIGURE 2.

Again, the ordinates of the graphical representations at the right of FIGURE 2 are shown in vertical alignment to set forth the phase relationship between the various quantities depicted. For the waveforms shown in FIGURE 2, the gate pulse 24 is shown occurring during the descending portion of a negative half cycle of the AC supply voltage waveform 20. As shown by waveform 46, the capacitor 40 is initially charged to the peak line voltage, and then upon occurrence of a gate pulse 24 and firing of SCR 16, begins to destroy as shown by the slope portion 48 of the waveform. Similarly, the voltage appearing at the terminal 51 is initially the peak line voltage as shown by waveform 50. It drops abruptly upon conduction of SCR 16 followed by a gradual decline of voltage as shown by slope portion 52.

Assuming that a capacitor 54 is not in the circuit, the voltage appearing at the anode of SCR 16 is shown by the waveform 56. Again, this voltage is initially the peak supply voltage but, it also drops abruptly when the SCR 16 is fired by a pulse 24. The voltage across SCR 16 remains at essentially zero volts until the SCR is turned off by a negative half cycle of the voltage, which occurs at point 58. The voltage across the SCR will then begin to rise as shown by curve 60. The decay of the voltages appearing across capacitors 40 and 18 is stopped when a positive half cycle begins, and both of the voltages again begin to rise. The voltage appearing at the terminal 51 rises with the line voltage during positive half cycles, while the rise of the voltage across capacitor 40 is limited by the current limiting resistor 44. As is seen by referring to waveforms 46, 50, and 56, it takes several positive half cycles to fully charge capacitor 40.

In a typical circuit arrangement, the current flowing through SCR 16 due to the discharge of capacitor 40 during a negative half cycle is insufficient to energize the solenoid 14 to a sufficient level to actuate its contacts, but it is sufficient to keep the SCR 16 in conduction until the next positive half cycle. It is thus seen that with the use of the turn-on circuit arrangement shown in FIGURE 2, comprising principally capacitor 40 and diode 42, the SCR 16 can be turned on during either positive or negative half cycles. Further, the supplementary current provided by the discharge of capacitor 40 makes it possible to fire SCR 16 during a descending portion of positive half cycle, and still provide sufficient energy to solenoid 14 to actuate its contact.

While the reversal in polarity of the AC voltage supplied to terminals 10 and 12 is ordinarily sufficient to cause the turn-off of SCR 16, as shown by the waveforms so far discussed with respect to FIGURE 2, a more positive turn-off is provided by the turn-off circuit arrangement of this invention. In accordance with the invention, the turn-off circuit comprises a passive impedance element, such as the capacitor 54, connected to apply a negative voltage to the anode of SCR 16 when the AC supply voltage passes through zero during its change from positive to negative polarity. For this purpose, the passive impedance element may be connected in parallel with the diode 42, or alternatively, it can be connected in parallel with the series circuit comprising diode 42, load 14, and current limiting resistor 38 as shown in FIGURE 2. The provision of the capacitor 54 causes a small negative voltage to be impressed on the anode of SCR 16 as shown in the lower waveform 62 in FIGURE 2. By comparison of the lower waveform 62 and the waveform 56 shown immediately above it, it is seen that the addition of the turn-off circuit comprising principally capacitor 54 causes a small negative voltage shown by the curve 64 to be applied to the anode of SCR 16 to assure turn-off of the SCR. This small negative voltage is brought about by diversion of the discharge current flow of capacitor 40 from SCR 16 through capacitor 54 when terminal 10 is negative. This diversion of the current flow aids in the turn off of the SCR 16 by reducing the current flow through it, and by creating the small negative voltage at the SCR anode. If desired, a resistor (not shown) may be employed in place of the capacitor 54.

An alternative embodiment of the circuit shown in FIGURE 2 is set forth in FIGURE 3. Corresponding circuit elements in FIGURES 2 and 3 have the same reference numerals. The embodiment shown in FIGURE 3 is particularly useful in providing longer periods of conduction of the SCR, for instance up to three cycles. In the embodiment of FIGURE 3, a series circuit including capacitor 40 and resistor 44 is connected directly to the junction of resistor 38, solenoid 14, and capacitor 18. With such arrangement a longer period of conduction can be obtained with a capacitor 40 of lesser capacitance than would be required in the circuit of FIGURE 2. Also, since in the circuit of FIGURE 3 capacitor 40 is charged through the solenoid 14, a resistor 44 of lesser resistance may be used. In this alternate embodiment the discharge of capacitor 40 maintains conduction of the SCR through several consecutive negative half cycles, such that current may be supplied to the solenoid 14 from the AC supply during several consecutive positive half cycles.

Thus, in a circuit in which a load is energized for at least one-half cycle by the firing of an SCR connected in series with the load and an AC supply, the provision of the turn-on circuit of this invention permits the SCR to be fired at any point during a cycle of the supply voltage, including the negative half cycle. The turn-off arrangement of this invention assures that the SCR will be turned off at the next succeeding negative half cycle following the turn-on of the SCR.

While particular embodiments of this invention has been shown and described, it will be obvious to those skilled in the art that various changes and modifications may be made without departing from this invention in its broader aspects and, therefore, it is intended that the appended claims cover all such changes and modifications as fall within the true spirit and scope of this invention:

1. A circuit for energizing a load having at least first and second terminals from an alternating current supply in response to the application of a pulse to the circuit at any time during a cycle of the alternating current supply voltage comprising, in combination:

(a) input terminals for connection to said alternating current supply;

(b) a silicon controlled rectifier having a gate electrode, an anode, and a cathode for controlling energization of said load;

(c) a diode having an anode and a cathode and poled to conduct current in the same direction as said silicon controlled rectifier;

(d) said anode of said diode being connected to a first of said input terminals, and said cathode of said silicon controlled rectifier being connected to a second of said input terminals;

(e) said load having said first terminal thereof connected to said cathode of said diode and said second terminal thereof connected to said anode of said silicon controlled rectifier so as to form with said diode and said silicon controlled rectifier a series circuit between said first and second input terminals;

(f) a capacitor connected in circuit with said diode and said silicon controlled rectifier for charging through said diode to apply a positive potential to the anode of said silicon controlled rectifier;

(g) a discharge path for said capacitor including said silicon controlled rectifier, said capacitor discharging through said discharge path in response to the application of a pulse to said gate electrode of said silicon controlled rectifier when the polarities of said input terminals are such that said diode prevents current flow through said silicon controlled rectifier from said input terminals;

(h) said capacitor being effective to continue discharging for the remainder of said polarity condition to maintain conduction of said silicon controlled rectifier during the remainder of said polarity condition, and to provide a discharge current through said silicon controlled rectifier in response to application of a pulse to said gate electrode of said silicon controlled rectifier at any time during a cycle of the alternating current supply voltage;

(i) a first current limiting resistor having first and second terminals being connected between said load and said silicon controlled rectifier, said first terminal of said first current limiting resistor being connected to said second terminal of said load and said second terminal of said first current limiting resistor being connected to said anode of said silicon controlled rectifier so as to form a first series circuit between said first and second input termnals; and (j) a second current limiting resistor being connected in series with said capacitor, said second current limiting resistor and said capacitor forming a second series crcuit whch is connected in parallel with at least a portion of said first series circuit including said first current limiting resistor and said silcon controlled rectifier such that said first and second current limiting resistors and said silicon controlled rectifier form said discharge path for said capacitor.

2. The circuit for energizing a load from an alternating current supply as defined in claim 1 wherein a passive impedance element is connected between said anode of said diode and said anode of said silicon controlled rectifier for impressing a negative voltage on said anode of said silicon controlled rectifier to assure turn-off of said silicon controlled rectifier when the polarities of said input terminals pass through zero in changing to polarities such that said diode prevents current flow through said silicon controlled rectifier from said input terminals.

3. The circuit for energizing a load from an alternating current supply as defined in claim 2 wherein said passive impedance element is a capacitor.

References Cited

UNITED STATES PATENTS

| | | | |
|---|---|---|---|
| 2,686,263 | 8/1954 | Konick | 328—210 |
| 3,414,738 | 12/1968 | Gilbreath | 307—293 |
| 3,318,358 | 5/1967 | Potts | 307—252 |
| 3,244,938 | 4/1966 | Schatz | 307—252 |
| 3,388,269 | 6/1968 | Bertioli | 307—252 |

DONALD D. FORRER, Primary Examiner

B. P. DAVIS, Assistant Examiner

U.S. Cl. X.R.

307—265, 293, 305